United States Patent [19]
Elser et al.

[11] 3,892,784
[45] July 1, 1975

[54] MANUFACTURE OF ALPHA-METHYL ETHERS OF ANTHRAQUINONE

[75] Inventors: Wolfgang Elser, Frankenthal; Helmut Schmidt, Ludwigshafen, both of Germany

[73] Assignee: BASF Aktiengesellschaft, Ludwigshafen (Rhine), Germany

[22] Filed: Mar. 18, 1974

[21] Appl. No.: 451,785

[30] Foreign Application Priority Data
Mar. 24, 1973  Germany................ 2314696

[52] U.S. Cl. ................... 260/383; 260/383
[51] Int. Cl. ............................... C07c 49/68
[58] Field of Search ........................ 260/383

[56] References Cited
UNITED STATES PATENTS
2,101,910  12/1937  Lodge et al. .............. 260/383 X
3,014,930  12/1961  Muenster et al. .............. 260/383

*Primary Examiner*—Paul F. Shaver
*Attorney, Agent, or Firm*—Johnston, Keil, Thompson & Shurtleff

[57] ABSTRACT

An improved process for the manufacture of α-methyl ethers of anthraquinone from the corresponding nitroanthraquinones by reacting the nitro compound with methanol in the presence of at least the stoichiometric amount of anhydrous or virtually anhydrous potassium carbonate with heating. Pure α-methyl ethers are obtained in high space-time yields. The α-nitroanthraquinones used may, if desired, be mixtures such as are obtained in the mononitration or dinitration of anthraquinone.

8 Claims, No Drawings

MANUFACTURE OF ALPHA-METHYL ETHERS OF ANTHRAQUINONE

This application discloses and claims subject matter described in German Pat. Application No. 23 14 696.5, filed Mar. 24, 1973, which is incorporated herein by reference.

This invention relates to an advantageous process for the manufacture of α-methyl ethers of anthraquinone from α-nitroanthraquinones.

According to German Pat. Nos. 77,818 and 75,054, α-methyl ethers of anthraquinone are manufactured by reacting mono- or di-nitroanthraquinones with methanol in excess in the presence of alkali metal methoxides or alkali metal hydroxides. These processes suffer from the drawback that very long reaction times are necessary to achieve complete conversion. Furthermore, the products are in some cases very impure. If the reaction time is shortened, the products contain unreacted nitroanthraquinones.

It is an object of the present invention to provide a process which is simple to carry out and which produces α-methyl ethers of anthraquinone in high purity and yield and does not suffer from the above drawbacks of the prior art processes.

We have found that α-methyl ethers of anthraquinone may be obtained in high purity and in an industrially and economically advantageous manner by reacting α-nitroanthraquinones with methanol in excess and in the presence of agents having an alkaline reaction, if the said agent is anhydrous or virtually anhydrous potassium carbonate present in at least the stoichiometric amount. This process produces pure α-methyl ethers of anthraquinone in high space-time yields.

It is surprising and was not foreseeable that the reaction of the α-nitroanthraquinones with methanol only provides pure reaction products in high yields and at a high reaction rate if the agent having an alkaline reaction used is anhydrous or virtually anhydrous potassium carbonate. If other readily accessible agents having an alkaline reaction such as sodium methoxide, potassium methoxide, potassium hydroxide, sodium hydroxide, sodium acetate, sodium carbonate or sodium hydrogen carbonate are used, the reaction proceeds slowly and the products are obtained in poor yields and are very impure.

Suitable α-nitroanthraquinones for the process of the invention are for example 1-nitroanthraquinone, 1,5-dinitroanthraquinone, 1,8-dinitroanthraquinone and mixtures of these α-nitroanthraquinones and also mixtures containing α-nitroanthraquinones such as are obtained in the mono- and di-nitrations of anthraquinone.

By anhydrous or virtually anhydrous potassium carbonate we mean the potassium carbonate known as calcined potassium carbonate or calcined potash.

For complete conversion it is necessary to use at least the stoichiometric amount of potassium carbonate, i.e. 0.5 mole per mole of nitro groups. Usually, from 0.75 to 2 moles of potassium carbonate are used per mole of nitro groups. Particularly pure products are obtained when from 0.85 to 1.25 moles of potassium carbonate are used per mole of nitro groups, this being the preferred range.

The amount of methanol used is not critical if the reaction mixture is stirrable before, during and after the reaction. However, in order to obtain high space-time yields, the mixture is kept as concentrated as possible. In general, the amount of methanol used is from 3 to 10 times and preferably from 4 to 6 times that of the α-nitroanthraquinone. The use of larger amounts of methanol is not detrimental but reduces the space-time yield of the reaction. In this case, it is also necessary to work up a larger amount of filtrate, which incurs further expense.

The reaction is advantageously carried out by adding anhydrous or virtually anhydrous potassium carbonate to a suspension of the α-nitroanthraquinones in methanol and heating the mixture to the reaction temperature with stirring. The reaction is generally carried out at temperatures of from 90° to 170°C and preferably from 120° to 130°C. Due to the lower boiling point of methanol, the reaction is carried out in closed vessels. At these temperatures, a pressure of from 4 to 7 atmospheres is set up in the reaction vessel. Particularly pure α-methyl ethers of anthraquinone are obtained in high spacetime yields when the reaction temperature is from 120° to 130°C, which is why this temperature range is preferred. At these temperatures, the reaction is usually over after from 3 to 5 hours.

The end of the reaction can be determined by assessing the nitrogen content of a worked-up sample or, advantageously, by analyzing a sample which has been removed from the reaction mixture and reduced, by thin-layer chromatography until no trace of aminoanthraquinone compounds can be detected.

After the reaction is over, the methanolic reaction mixture is cooled and the products of the process are removed from said mixture by usual methods, i.e. filtration, centrifuging or decantation. The filter cake is then washed with warm water until free of salt and neutral and dried. A substantial portion of the methanol can be recovered from the methanolic mother liquor by distillation.

The advantage of the process of the invention over the prior art processes is that the use of anhydrous or virtually anhydrous potassium carbonate as agent having an alkaline reaction enables the reaction to be carried out at elevated temperature without the occurrence of decomposition reactions, with the result that the products are obtained in higher yields and higher purity. The resulting pure α-methyl ethers of anthraquinone are valuable intermediates in the synthesis of dyes.

The invention is further illustrated by the following Examples in which parts and percentages are by weight.

EXAMPLE 1

1,5-Dimethoxyanthraquinone 100 parts of 1,5-dinitroanthraquinone, 90 parts of anhydrous potassium carbonate and 500 parts of methanol are stirred in a closed vessel for 5 hours at 120°C (pressure 6.5 atmospheres). After cooling, the reaction mixture is filtered and the residue is washed neutral with warm water and dried. The yield is 85 parts of 1,5-dimethoxyanthraquinone in the form of a pale yellowish-brown powder having a nitrogen content of less than 0.5%.

EXAMPLE 2

Mixture of 1,5- and 1,8-dimethoxyanthraquinones 200 parts of a mixture obtained in the dinitration of anthraquinone and containing 49.4% of 1,5-dinitroanthraquinone, 36.6% of 1,8- dinitroanthraquinone and 14% of 1,6-, 1,7-, 2,6- and 2,7-di-nitroanthraquinones, 180 parts of anhydrous potassium carbonate and 1,100 parts of methanol are stirred in a closed vessel for 4 hours at 130°C (pressure 6.0 atmospheres). After cooling, the mixture is worked up as described in Example 1. The yield is 152 parts of a mixture of 1,5- and 1,8-dimethylanthraquinone in the form of a pale yellowish-brown nitrogen-free product.

EXAMPLE 3

Example 2 is repeated except that 200 parts of anhydrous potassium carbonate is used instead of 180 parts thereof and heating is carried out for 9 hours at 110°C. The yield is 160 parts of a mixture of 1,5- and 1,8-dimethoxyanthraquinone, this mixture and that obtained in Example 2 being identical.

EXAMPLE 4

Example 2 is repeated except that 400 parts of anhydrous potassium carbonate is used instead of 180 parts thereof and 1,600 parts of methanol is employed. The yield is 161 parts of a mixture of 1,5- and 1,8-dimethoxyanthraquinone, this mixture and that obtained in Example 2 being identical.

EXAMPLE 5

Example 2 is repeated except that 250 parts of anhydrous potassium carbonate is used instead of 180 parts thereof. The yield is 158 parts of a mixture of 1,5- and 1,8-dimethoxyanthraquinone, this mixture and that obtained in Example 2 being identical.

EXAMPLE 6

Example 2 is repeated except that the reaction is carried out at 170°C with stirring for 3 hours. The yield is 102 parts of a mixture of 1,5- and 1,8-dimethoxyanthraquinone, this mixture and that obtained in Example 2 being identical.

EXAMPLE 7

1-Methoxyanthraquinone 100 parts of 1-nitroanthraquinone, 60 parts of anhydrous potassium carbonate and 500 parts of methanol are stirred in a closed vessel for 3-4 hours at 120°C. The pressure is 6.0 atmospheres. Working up is effected as described in Example 1 and there is obtained 87 parts of 1-methoxyanthraquinone in the form of a pale yellowish-brown product having a nitrogen content of less than 0.5%.

We claim:

1. A process for the manufacture of α-methyl ethers of anthraquinone, wherein an α-nitroanthraquinone is reacted with methanol in the presence of at least the stoichiometric amount of anhydrous or virtually anhydrous potassium carbonate.

2. A process as claimed in claim 1, wherein from 0.75 to 2 moles of potassium carbonate are used per mole of nitro groups.

3. A process as claimed in claim 1, wherein from 0.85 to 1.25 moles of potassium carbonate are used per mole of nitro groups.

4. A process as claimed in claim 1, wherein the reaction is carried out at a temperature of from 90° to 170°C.

5. A process as claimed in claim 1, wherein the reaction is carried out at a temperature of from 120° to 130°C.

6. A process as claimed in claim 1, wherein the reaction is carried out in an amount of methanol which is from 3 to 10 times that of the nitro compound.

7. A process as claimed in claim 1, wherein said α-nitroanthraquinone is a member selected from the group consisting of 1-nitroanthraquinone, 1,5-dinitroanthraquinone, 1,8-dinitroanthraquinone and a mixture thereof.

8. A process as claimed in claim 1, wherein said α-nitroanthraquinone is a mixture of α-nitroanthraquinones obtained in the mono- or dinitration of anthraquinone.

* * * * *